W. Groat,
Slatted Floor Covering.
No. 55,489.     Patented June 12, 1866.
Fig: 1.
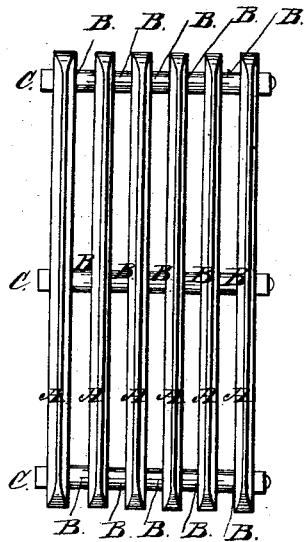
Fig: 2.
Witnesses:             Inventor:
Warren Groat

UNITED STATES PATENT OFFICE.

WARNER GROAT, OF GREEN ISLAND, NEW YORK.

IMPROVED WOODEN MAT FOR CARS.

Specification forming part of Letters Patent No. 55,489, dated June 12, 1866.

*To all whom it may concern:*

Be it known that I, WARNER GROAT, of Green Island, in the county of Albany and State of New York, have invented a new and Improved Wooden Mat for Railroad-Cars; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, an end view of the same.

Similar letters of reference indicate like parts.

This invention relates to a new and improved mode of constructing supplemental slat floorings for railroad-cars, and is designed to supersede floor-cloths, rope matting, &c., as well as the different forms of slat flooring hitherto used for the purpose.

My invention, which I term a "wooden mat," is constructed as follows: A represents a series of parallel slats, constructed of any suitable wood, having parallel vertical sides and their upper edges beveled in inverted-V form, as shown clearly in Fig. 2. These slats A are spaced a suitable distance apart by means of wooden washers B, which may be of cylindrical or other form, said washers being secured in position, and the slats also, by bolts C, which pass through them.

The washers B are arranged in rows, as shown in Fig. 1, any suitable number of rows being employed.

The under surfaces of the slats A may be beveled like the upper surfaces, if desired; but I do not deem that necessary. It is preferable to have the upper surfaces beveled in order to admit of dirt passing freely down between the slats.

This mat, thus constructed, is very strong and durable, and it may be manufactured at a very moderate cost, all mortising and tenoning being avoided.

The mats may be made of any desired width and length, as circumstances may require.

Having thus described my invention, I claim as new and desire to secure by Letters Patent—

A wooden mat for railroad-cars and for other similar or suitable purposes, composed of wooden slats A, spaced or retained at a proper distance apart by washers B and bolts C, substantially as herein shown and described.

WARNER GROAT.

Witnesses:
WM. F. MCNAMARA,
ALEX. F. ROBERTS.